United States Patent
Jinnai et al.

(10) Patent No.: US 7,376,339 B2
(45) Date of Patent: *May 20, 2008

(54) MULTI-IMAGE REPRODUCING AND RECORDING APPARATUS WITH APPENDED INFORMATION

(75) Inventors: Shigeru Jinnai, Kawasaki (JP); Makoto Kondo, Yokohama (JP); Yasutomo Suzuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/178,425

(22) Filed: Jul. 12, 2005

(65) Prior Publication Data

US 2005/0259953 A1    Nov. 24, 2005

Related U.S. Application Data

(60) Division of application No. 08/395,207, filed on Feb. 27, 1995, now Pat. No. 6,968,117, which is a continuation of application No. 07/876,744, filed on Apr. 28, 1992, now abandoned.

(30) Foreign Application Priority Data

| May 1, 1991 | (JP) | ............................ 3-99968 |
| May 1, 1991 | (JP) | ............................ 3-99969 |
| Apr. 16, 1992 | (JP) | ............................ 4-96829 |

(51) Int. Cl.
    *H04N 5/91* (2006.01)
(52) U.S. Cl. ........................ 386/95; 386/125
(58) Field of Classification Search .................. 386/46, 386/52, 95, 107, 117, 120, 121, 125, 126
    See application file for complete search history.

(56) References Cited

U.S. PATENT DOCUMENTS

| 4,498,107 A | 2/1985 | Yoshimaru et al. ......... 358/256 |
| 4,555,803 A | 11/1985 | Hirose ......................... 382/61 |
| 4,698,664 A | 10/1987 | Nichols et al. ............... 358/10 |
| 4,769,721 A | 9/1988 | Kajiura ...................... 360/10.1 |
| 4,860,122 A | 8/1989 | Kanamaru .................. 358/341 |

(Continued)

FOREIGN PATENT DOCUMENTS

JP    61-153769    7/1986

(Continued)

*Primary Examiner*—Huy T Nguyen
(74) *Attorney, Agent, or Firm*—Fitzpatrick, Cella, Harper & Scinto

(57) ABSTRACT

In order to select and designate the appropriate identification information when the multi image representing picture is recorded as a multi image onto a recording medium, a reproducing circuit 20 reproduces a recorded image at a designated track, its reproduced image is stored as a mini image for the representation of the multi image into a frame memory 24, and the ID signal for each reproduced image is stored in a memory 34. A recording circuit 32 records the multi image representing picture to be stored in the memory 24 as one still picture and records it in the recording medium. A system control circuit 22 reads only an ID signal of a track corresponding to the state of instructing means 36 or switching means 38 among the ID signals stored in the memory 34, and supplies other portions except for the field/frame and the track number to the recording circuit 32.

8 Claims, 13 Drawing Sheets

U.S. PATENT DOCUMENTS

| | | | |
|---|---|---|---|
| 4,888,648 A | 12/1989 | Takeuchi et al. | 358/335 |
| 4,905,077 A | 2/1990 | Ishii | 358/22 |
| 4,910,604 A | 3/1990 | Takei et al. | 358/310 |
| 5,010,498 A | 4/1991 | Miyata | 364/519 |
| 5,021,770 A | 6/1991 | Aisaka et al. | 340/709 |
| 5,027,230 A | 6/1991 | Nakayama | 360/35.1 |
| 5,050,003 A | 9/1991 | Horii et al. | 358/342 |
| 5,111,300 A | 5/1992 | Nam | 358/209 |
| 5,138,503 A | 8/1992 | Nishida | 360/35.1 |
| 5,157,511 A | 10/1992 | Kawai et al. | 358/335 |
| 5,177,619 A | 1/1993 | Sato | 358/342 |
| 5,459,582 A | 10/1995 | Takahashi | 358/335 |
| 5,596,419 A | 1/1997 | Yoshimura et al. | 386/52 |

FOREIGN PATENT DOCUMENTS

| | | |
|---|---|---|
| JP | 62-248390 | 10/1987 |
| JP | 64-36172 | 2/1989 |

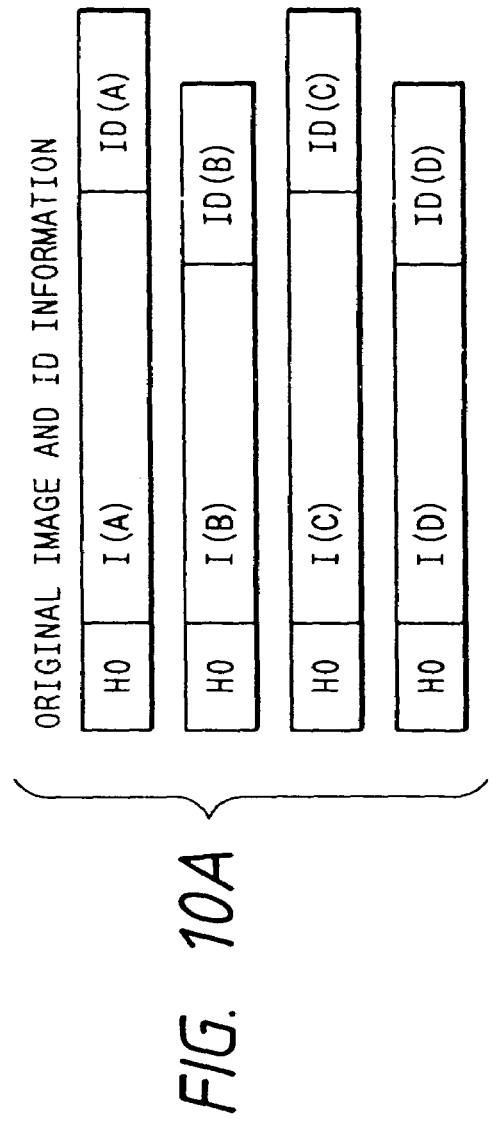
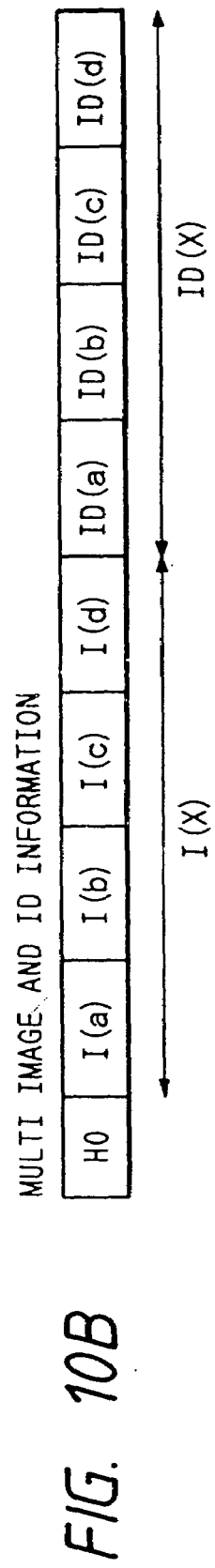
FIG. 10A
FIG. 10B

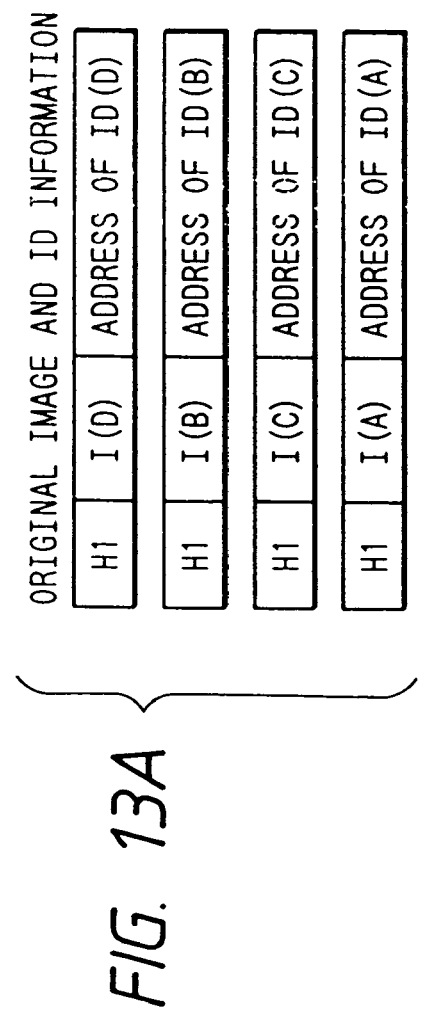
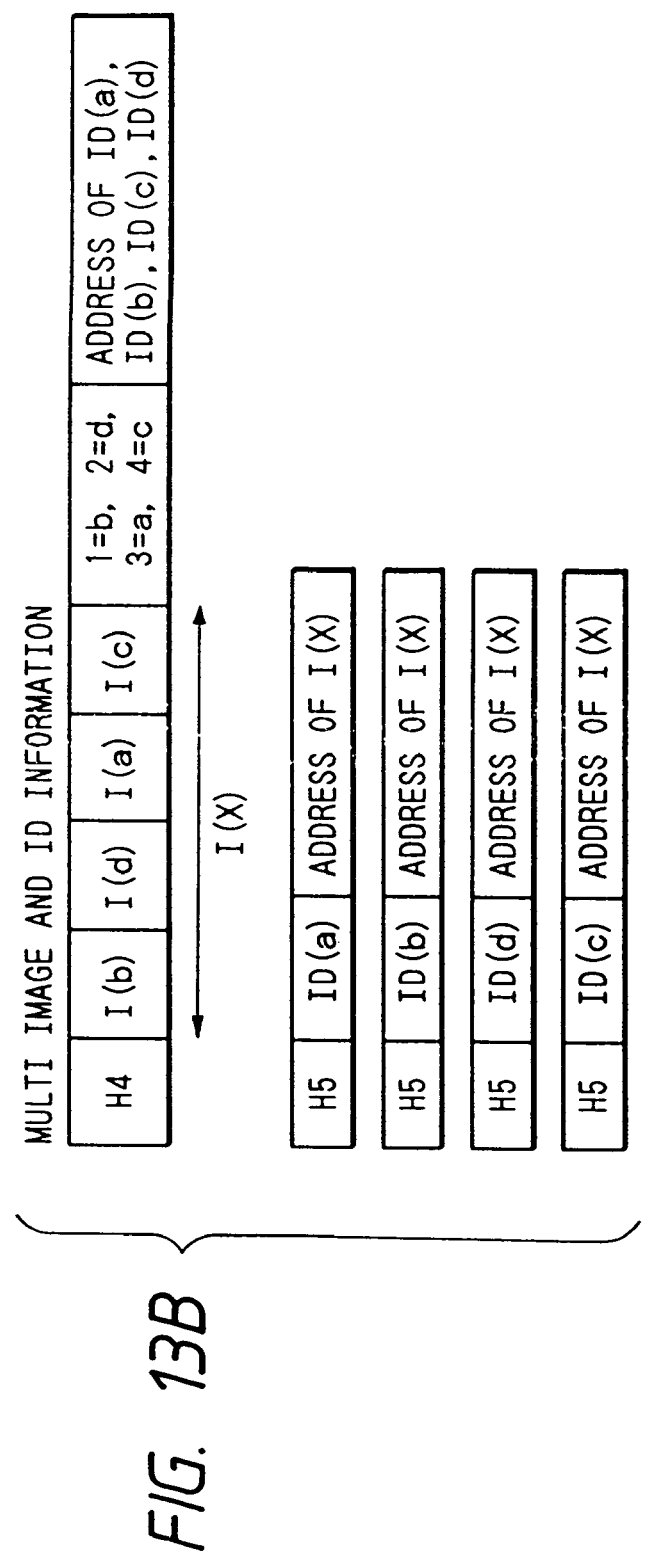
FIG. 13A
FIG. 13B

MULTI-IMAGE REPRODUCING AND RECORDING APPARATUS WITH APPENDED INFORMATION

This is a divisional of U.S. patent application Ser. No. 08/395,207, filed Feb. 27, 1995, now pending, which is a continuation of U.S. patent application Ser. No. 07/876,744, filed Apr. 28, 1992.

BACKGROUND OF THE INVENTION

1. Field of the Invention

The present invention relates to an image reproducing and/or recording apparatus, and more specifically to such an apparatus wherein a multi-image representing a picture is recorded as one image onto a recording medium.

2. Related Background Art

In apparatuses for reproducing a still picture from a still picture recording medium such as a still video floppy, the so-called multi-image reproduction is well known in which a monitor screen is partitioned into a plurality of mini-screens, each displaying an individual reproduced image.

Also, in apparatuses capable of reproducing the multi-image, it is well know that such a picture reproduced from the multi-image is recorded as one still picture onto a still video floppy. In this configuration, the ID signal was not recorded or the ID signal created under a certain rule by an ID setting circuit was recorded for a newly recorded still picture which was reproduced from the multi-image.

In a conventional example as described, there was a drawback in that the ID signal might disappear or not correspond to the original image ID even if it was recorded.

SUMMARY OF THE INVENTION

The present invention aims to provide a recording apparatus which overcomes the above-mentioned drawback.

Also, it is another object of the present invention to provide a recording apparatus capable of recording a picture with appropriate identification information appended to the image information to be recorded.

To accomplish those objects, according to a preferred embodiment of the present invention, there is disclosed an image recording apparatus, comprising reproducing means for reproducing a recorded image on a recording medium, an image memory for storing a predetermined number of images reproduced by said reproducing means as respective mini-screens for representing a multi-image, recording means for recording onto the recording medium a multi-image representing the picture to be stored in said image memory as one picture, and selecting means for selecting the identification information of the picture to be recorded by said recording means from pieces of identification information for recorded images which constitute the mini-screens for representing the multi-image.

Also, it is a further object of the present invention to provide a recording apparatus capable of recording a picture with the identification information selected manually appended to the image information to be recorded.

It is another object of the present invention to provide a reproducing apparatus having a multi-image reproducing feature, wherein it has further new features.

Other objects and features of the present invention will be apparent from the ensuing description of the preferred embodiments and the accompanying drawings.

BRIEF DESCRIPTION OF THE DRAWINGS

FIGS. 10A and 10B are examples of the recording format for the image information and its identification information.

FIGS. 13A and 13B are other examples of the recording format for the image information and its identification information.

DETAILED DESCRIPTION OF THE PREFERRED EMBODIMENTS

An embodiment of the present invention will be described below with reference to the drawings.

Figure 1:
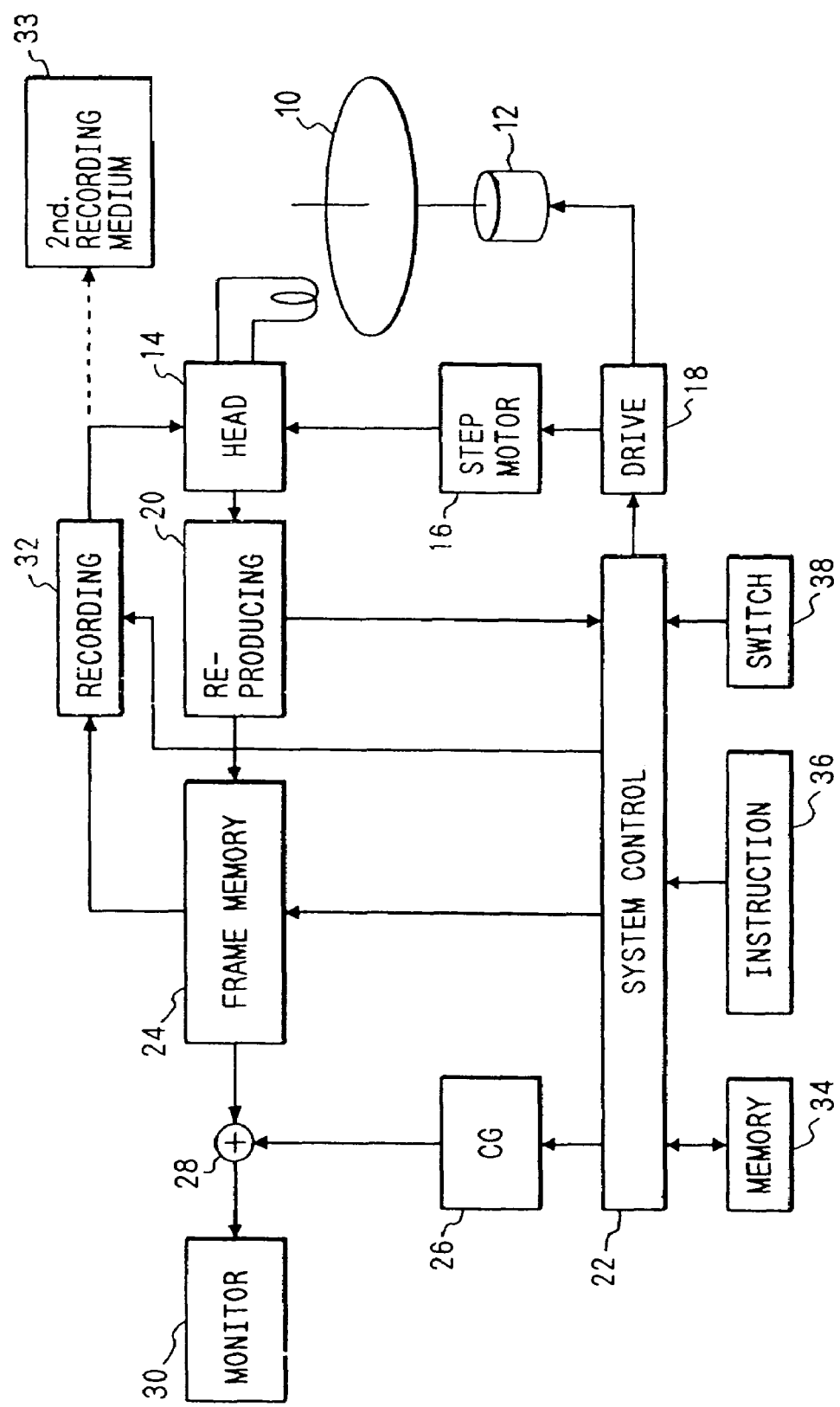
FIG. 1 is a configuration block diagram of an embodiment of the present invention.

FIG. 1 is a configuration block diagram of an embodiment of the present invention. 10 is a still video floppy which is a recording medium in this embodiment, 12 is a motor for rotating the floppy 10, 14 is a magnetic head for the reproduction of records, 16 is a step motor for feeding the magnetic head 14 in a radial direction of the floppy 10, and 18 is a driving circuit for driving the motor 12 and the step motor 16.

20 is a reproduction circuit for reproducing the output of the magnetic head 14, 22 is a system control circuit for controlling the entire system, 24 is a frame memory for storing a reproduced video signal from the reproduction circuit 20 at a memory location corresponding to a predetermined image position in the representation of a multi-image under the control of the system control circuit 22, 26 is a character generator (CG) for generating a character pattern signal corresponding to a character code signal from the system control circuit 22, 28 is a superimposing circuit for superimposing the character pattern signal from the CG 26 onto a video signal for the representation of the multi-image which is output from the frame memory 24, and 30 is a monitor for displaying an output video signal of the superimposing circuit 28.

32 is a recording circuit for recording a reproduced picture of a multi-image stored in the frame memory 24 as one still picture.

34 is a memory for storing the ID information reproduced from the track on which the multi-image is reproduced. 36 is an instructing means for instructing a pointer to be moved on the monitor screen, and used as means for designating mini-screens for the representation of the multi-image.

38 is a switching means for switching the reference for adopting the ID in recording a reproduced picture of the multi-image as one still picture, and specifically, the largest track number or smallest track number among tracks where the multi-image is reproduced, the oldest or newest photographing date (recording date), or one track ID instructed by the instructing means 36 is designated.

Figure 2:
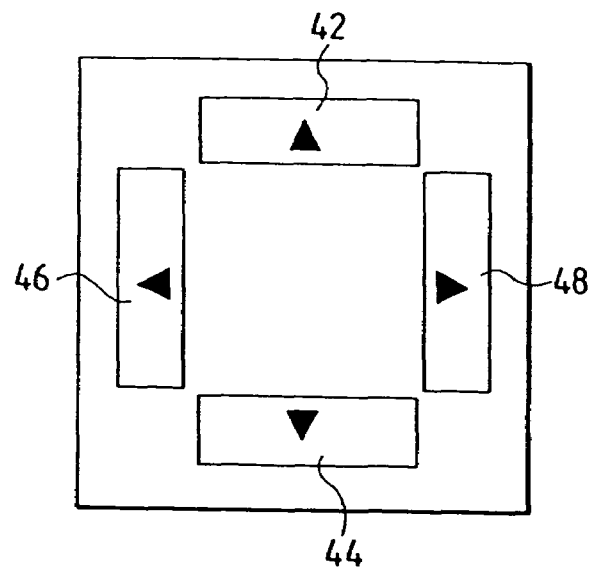
FIG. 2 is a view of an operation panel on an instructing means 36.
Figure 3:
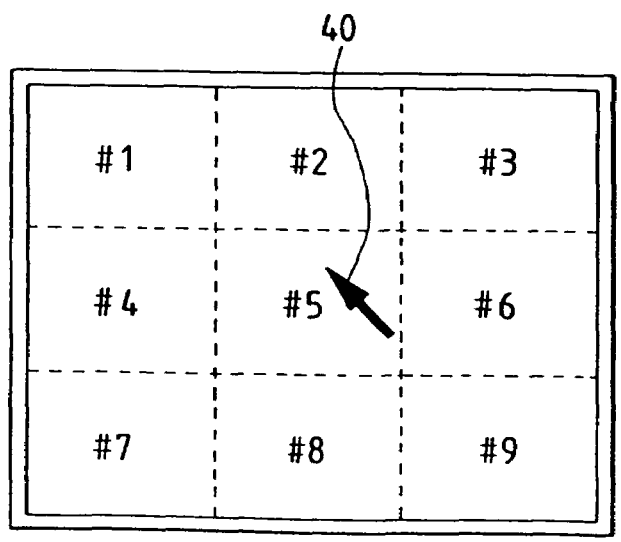
FIG. 3 is an explanation view of a monitor screen.

FIG. 2 shows an operation panel of the instructing means 36, and FIG. 3 is a monitor screen for the monitor 30, having nine partitions in this embodiment. On the monitor screen, a pointer 40 shaped as an arrow is displayed, and moved upward, downward, leftward or rightward in accordance with the operation of shift keys 42, 44, 46, 48 for the instructing means, respectively. Note that the CG 26 outputs an image signal corresponding to the pointer 40. Such a gang control of the shift keys 42, 44, 46 and 48 with the pointer 40 is well known and not directly related to this invention. Therefore the explanation is omitted.

Figure 4:
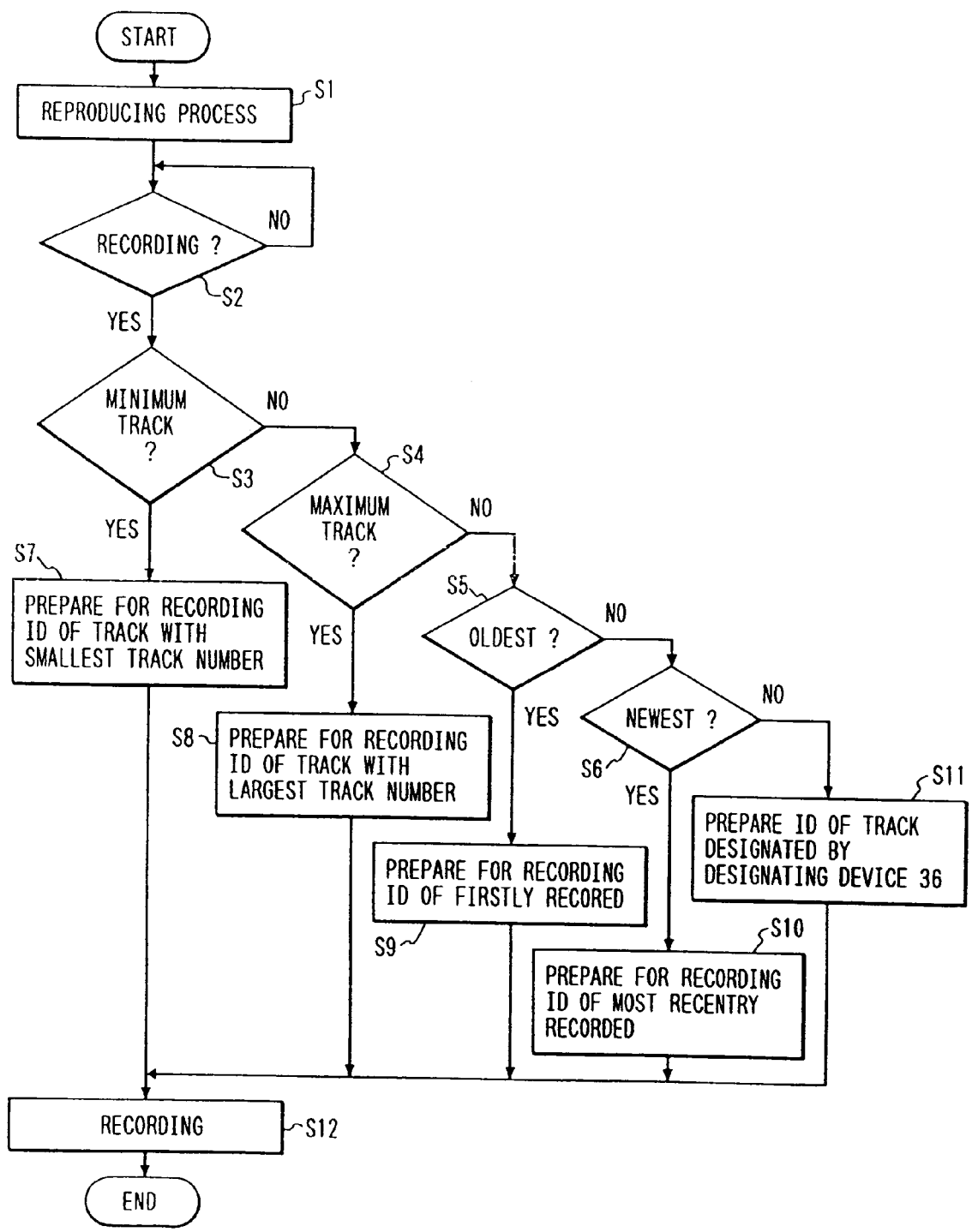
FIG. 4 is a flowchart of the operation in this embodiment.

FIG. 4 shows an operation flowchart of this embodiment. Referring to FIG. 4, the operation of this embodiment will be described. By positioning the magnetic head 14 at a specified track of the still video floppy 10 with the driving circuit 18 and the step motor 16, nine images, for example, are reproduced from corresponding tracks with the reproduction circuit 20 (S1). The reproduction circuit 20 supplies reproduced image signals to the frame memory 24, each reproduced image signal being stored at a predetermined location of the frame memory 24. The reproduction circuit 20 also supplies the ID signal of the reproduced image to the system control circuit 22, which then stores it in the memory 34.

Next, the operation waits for an instruction of the recording (S2). Meanwhile, the user determined the ID useful in recording a multi-image representing picture with the instructing means 36 and the switching means 38. If there is an instruction for the recording, the system control circuit 22 makes the ID of a track designated by the instructing means 36 or the switching means 38 an ID for use in recording multi-image representing the picture. That is, in correspondence with the smallest track number (S3), the largest track number (S4), the oldest recording date (S5), and the newest recording date (S6), which are selected by the switching means 38, the track ID of the smallest track number (S7), the track ID of the largest track number (S8), the track ID of the oldest recording date (S9) or the track ID of the newest recording date (S10), within the displayed picture, is read from the memory 24, and other portions except for its field/frame and the track number are supplied to the recording circuit 32 (S11).

The recording circuit 32 records the supplied ID number, together with the multi-image representing picture stored in the frame memory 24. The output of the recording circuit 32 is recorded in the floppy disk 10 by the magnetic head 14.

Note that pieces of the ID information stored in the memory 34 are sorted according to the recording date to be able to retrieve an image of the oldest or newest recording date. It will be appreciated that in this embodiment, the multi-image representing picture and the identification or ID information appended to the multi-image may be recorded in a second medium 33 different from the floppy disk 10, as shown by the dotted line in FIG. 1.

In this embodiment, the ID of the original image is used for the ID of the multi-image representing picture, so that the relation with the original image will not be lost.

Figure 5:
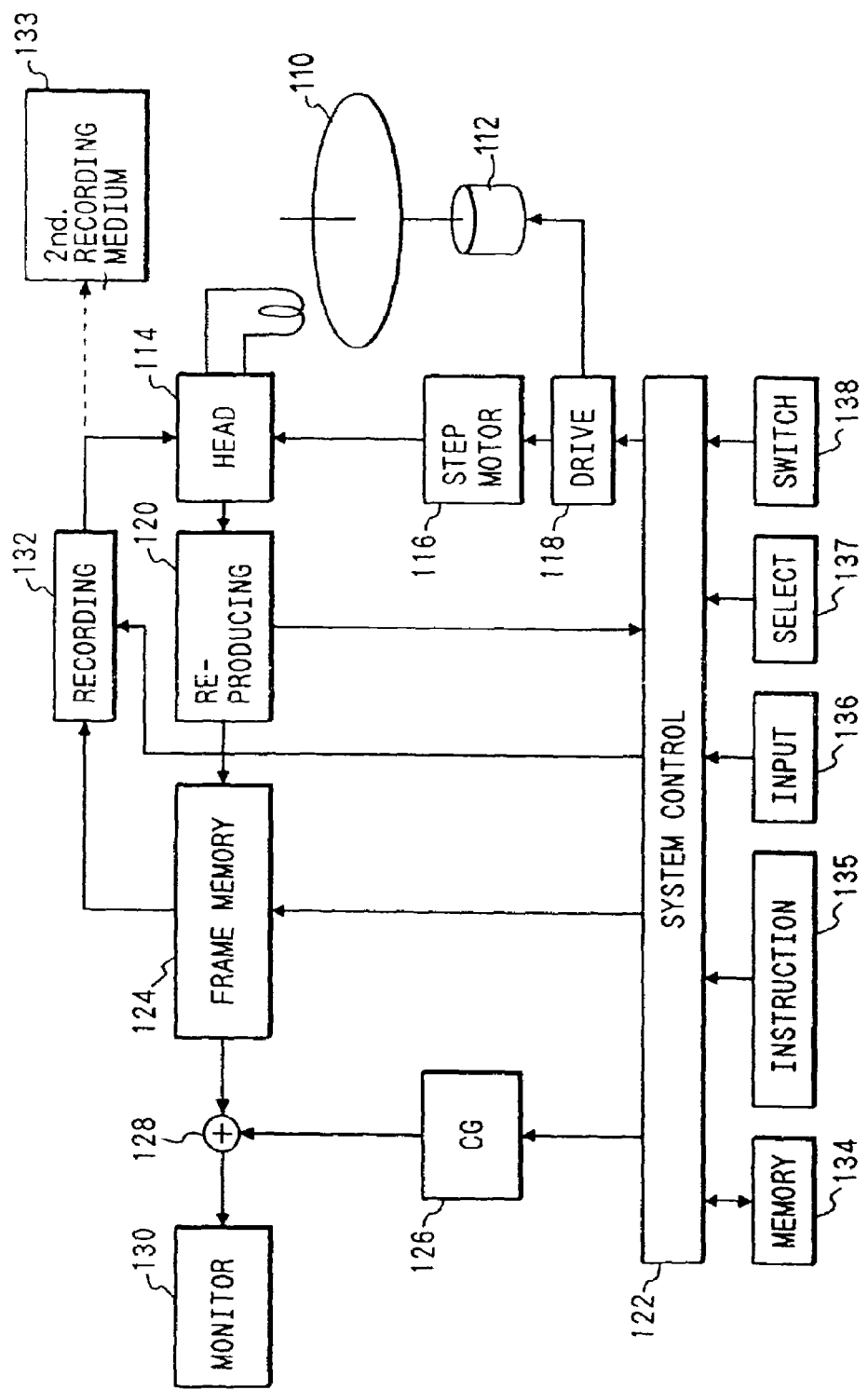
FIG. 5 is a configuration block diagram of a second embodiment of the present invention.

FIG. 5 shows a configuration block diagram of a second embodiment of the present invention. 110 is a still video floppy which is a recording medium, 112 is a motor for rotating the floppy 110, 114 is a magnetic head for the reproduction of records, 116 is a step motor for feeding the magnetic head 114 in a radial direction of the floppy 110, and 118 is a driving circuit for driving the motor 112 and the step motor 116.

120 is a reproduction circuit for reproducing the output of the magnetic head 114, 122 is a system control circuit for controlling the entire system, 124 is a frame memory for storing a reproduced video signal from the reproduction circuit 120 at a memory location corresponding to a predetermined image position in the representation of the multi-image under the control of the system control circuit 122, 126 is a character generator (CG) for generating a character pattern signal corresponding to a character code signal from the system control circuit 122, 128 is a superimposing circuit for superimposing the character pattern signal from the CG 126 onto a video signal for the representation of the multi-image which is output from the frame memory 124, and 130 is a monitor for displaying an output video signal of the superimposing circuit 128.

132 is a recording circuit for recording a reproduced picture of the multi-image stored in the frame memory 124 as one still picture.

134 is a memory for storing the ID information reproduced from the track on which the multi-image is reproduced. 135 is an instructing means for instructing a pointer to be moved on the monitor screen, and used as means for designating mini-screens for the representation of the multi-image. 136 is an input means for inputting the ID, which may be entered with the ten keys, or with alphabets or kanas. 137 is a selecting means for selecting the ID to be recorded, which may be an ID input by the input means 136, or a track ID determined by the instructing means 135 or the switching means as hereinafter described.

138 is a switching means for switching the reference for adopting the ID useful in recording a reproduced picture of the multi-image as one still picture, and specifically, the largest or smallest track number among tracks where the multi-image is reproduced, the oldest or newest photographing date (recording date), or a track ID instructed by the instructing means 135 is designated.

An operation panel of the instructing means 135, and a monitor screen for the monitor 130 are the same as those in FIGS. 2 and 3, previously described.

Figure 6:
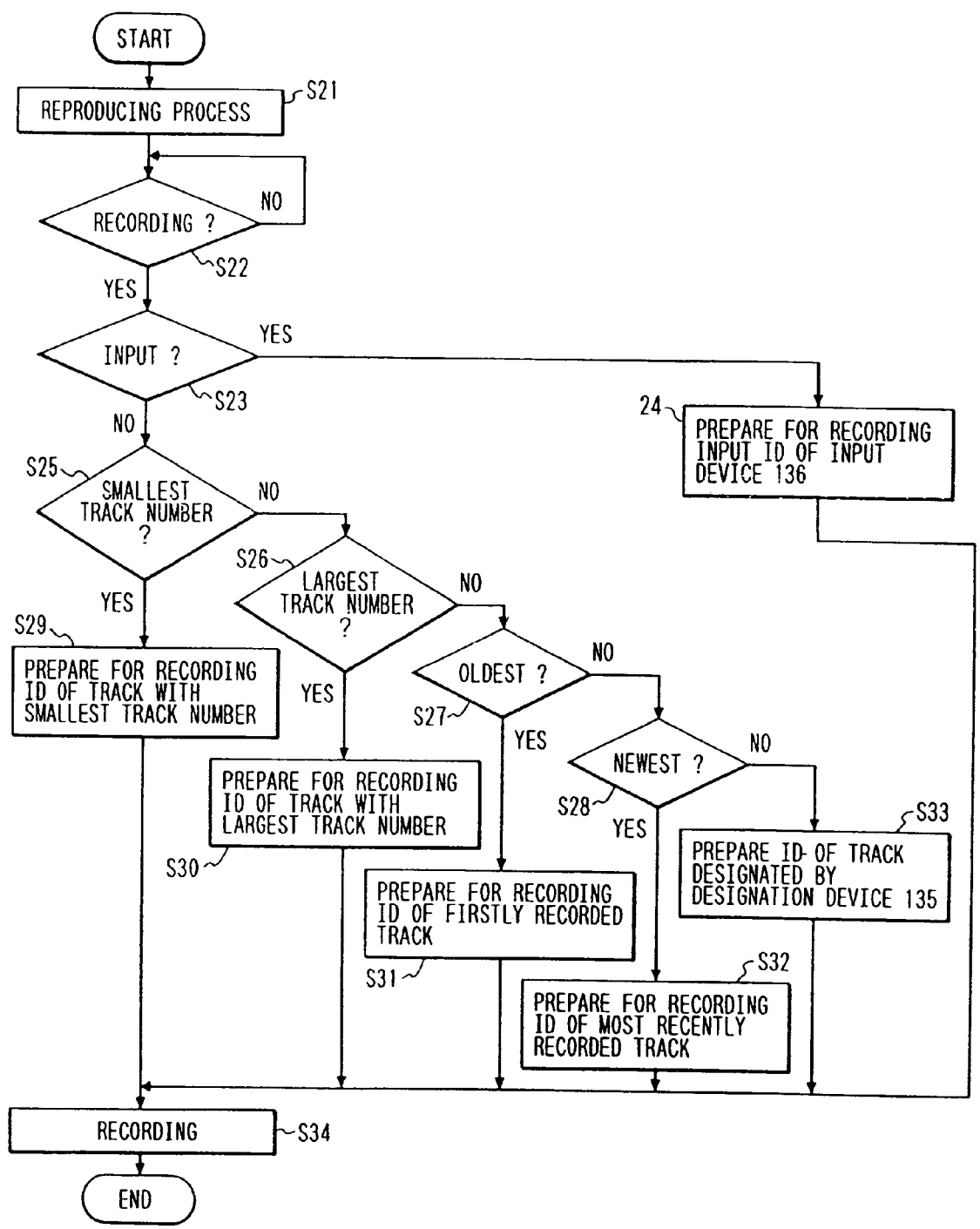
FIG. 6 is a flowchart of the operation in the embodiment of FIG. 5.

FIG. 6 shows an operation flowchart of this embodiment. Referring to FIG. 6, the operation of this embodiment will be described. By positioning the magnetic head 114 at a specified track with the driving circuit 118 and the step motor 116, nine images are reproduced from corresponding tracks by the reproduction circuit 120 (S21). The reproduction circuit 120 supplies reproduced image signals to the frame memory 124, each reproduced image signal being stored at a predetermined location of the frame memory 124. The reproduction circuit 120 also supplies the ID signal of the reproduced picture to the system control circuit 122, which then stores it in the memory 134.

Next, the operation waits for an instruction to begin the recording (S22). Meanwhile, the user selects the recording ID with the selecting means 137, from among the ID input by the input means 136 and the track ID designated by the instructing device 135 or the switching means 138. If there is an instruction for the recording (S22), the system control circuit 22 determines the ID to be an ID input by the input means or a track ID designated by the instructing means 135 or the switching means 138 through the selecting means 137 (S23), and supplies the ID input by the input means as a recording ID to the recording circuit 132 if it is input by the input means 136.

If the input means 136 is not used (S23), the track ID for use in recording the multi-image reproduced picture is determined, in accordance with the state of the instructing means 135 or the switching means 138. That is, in correspondence with the smallest track number (S25), the largest track number (S26), the oldest recording date (S27), and the newest recording date (S28), which are selected by the switching means 138, the track ID of the smallest track number (S29), the track ID of the largest track number (S30), the track ID of the oldest recording date (S31) or the track ID of the newest recording date (S32), within the displayed picture, is read from the memory 126, and other portions except for its field/frame and the track number are supplied to the recording circuit 132. If neither of S25 to S28 is selected, the ID of the image instructed by the instructing means 135 is read from the memory 126, and other portions except for its field/frame and the track number are supplied to the recording circuit 132 (S33). The operation is the same as described in FIG. 4.

The recording circuit 132 records the supplied ID number, together with the multi-image representing picture stored in the frame memory 124. The output of the recording circuit 132 is recorded in the floppy disk 110 by the magnetic head 114.

It is when there is no ID record in any of the tracks where the multi-image is reproduced, for example, that the input by the input means 136 is recorded as an ID. In other words, when the ID is not recorded in any tracks where the multi-image is reproduced, or when there is no ID on the track designated by the instructing means 135 or the switching means 138, the user may be prompted for an input with the input means 136.

It will be also appreciated that in this embodiment, the image information and the identification information with which the multi-image is reproduced may be recorded in a second medium 133 different from the floppy disk 110, as in the embodiment of FIG. 1.

Note that pieces of ID information stored in the memory 134 are sorted according to the recording date to be able to retrieve an image at the oldest or newest recording date.

With the embodiments of FIGS. 1 and 5, there is a drawback that pieces of identification information for images making up a multi-image are only partially stored. Further, there is another drawback that it is difficult to know to which picture the stored identification information corresponds on the mini-screen for the multi-image.

Figure 7:
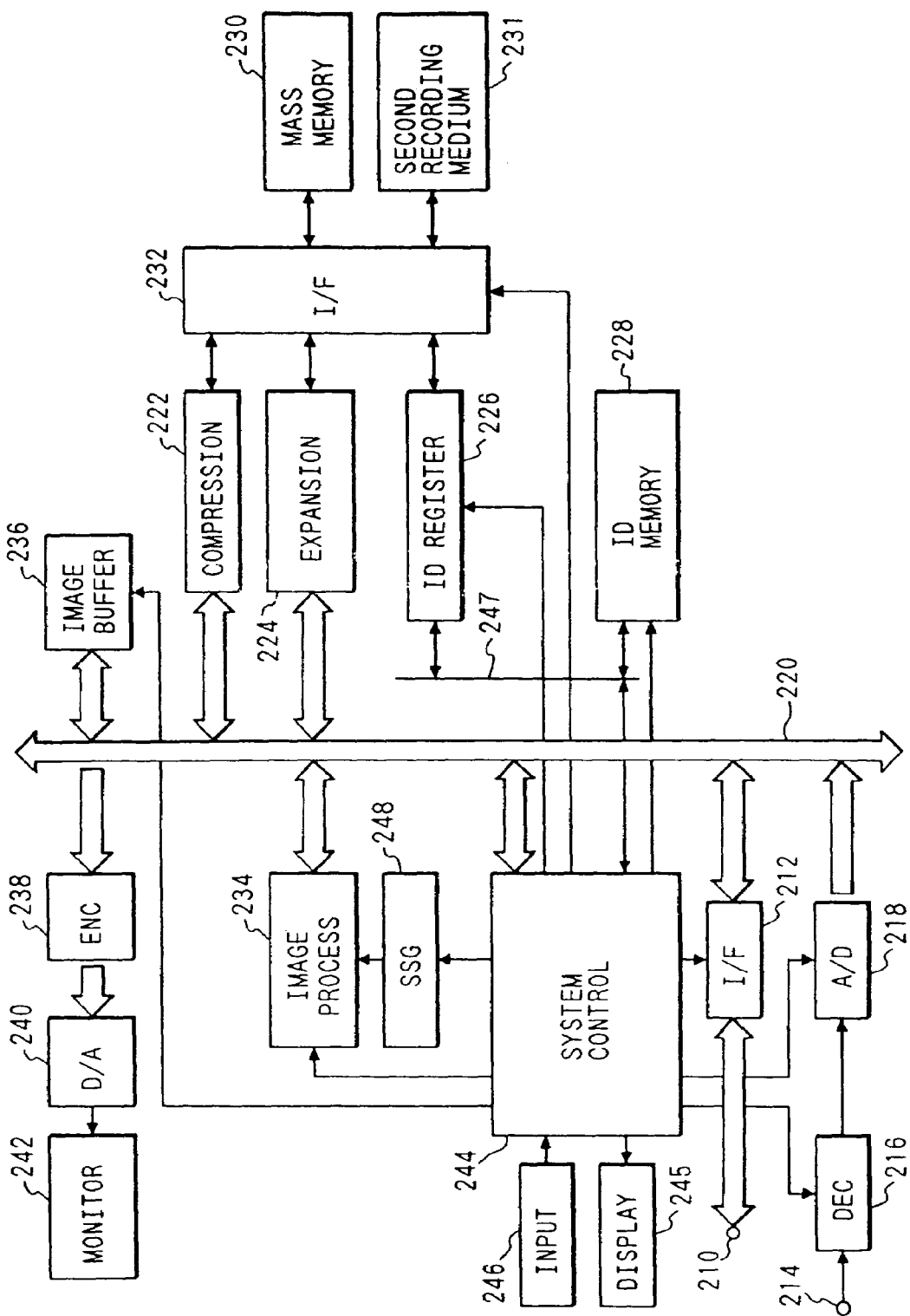
FIG. 7 is a configuration block diagram of a third embodiment of the present invention.

FIG. 7 shows a configuration block diagram for an embodiment which resolves those drawbacks. 210 is an input/output terminal for the digital image signal, 212 is an interface for the input/output terminal 210, 214 is an input terminal for the analog image signal, 216 is a decoder for converting an analog image signal from the input terminal 214 into a predetermined form (e.g., luminance/color difference signal, or RGB signal), and 218 is an A/D converter for digitizing the output of the decoder 216. The interface 212 and the A/D converter 218 are connected via a data bus 220 to various circuits as t hereinafter described.

222 is a compression circuit for compressing the image data, 224 is an expansion circuit for expanding the compressed image data, 226 is an ID register for temporarily storing the identification information of an image to be stored or reproduced, 228 is an ID memory for storing the identification information from the ID register 226 or input from any other portion, and 230 is a mass memory, which is detachable, for storing a plurality of images with identification information thereof. The mass memory 230 may be one of a variety of recording or storage media such as a semiconductor memory, a hard disk, an optical disk, or a magneto-optical disk.

232 is an interface to the mass memory 230. The interface 232 serves to supply image data compressed by the compression circuit 222 and an identification signal from the ID register 226 to the mass memory 230, as well as supplying compressed image data read from the mass memory 230 and its identification information to the expansion circuit 224 and the ID register 226, respectively.

234 is an image processing circuit, which consists of a digital signal processing circuit (DSP), for performing a multi-image editing process, as well as the filtering, the interpolation, the edge enhancement, and the sampling rate conversion, and 236 is an image buffer for temporarily storing the image data for the processing with the compression circuit 222, the expansion circuit 224 and the image processing circuit 234.

238 is an encoder for converting image data on the data bus 220 into a video signal in a predetermined format (e.g., NTSC format), 240 is a D/A converter for converting the digital output of the encoder 238 into the analog form, and 242 is a monitor for displaying the output of the D/A converter 240.

244 is a system control circuit for controlling the entire system, and 246 is an input means for inputting into the system control circuit 244 the information such as an instruction, character information, date/time information (year, month and day or time, minute and second), the longitude and latitude information or the ground clearance with a global positioning system (GPS), and further the photographing conditions (e.g., aperture, shutter speed, focusing information) if used with an image pickup device. The system control circuit 244 accesses the ID register 226 and the ID memory 228 via an ID signal line 247.

248 is a synchronizing signal generation circuit (SSG) for supplying various clocks or the synchronizing signal to the above circuit. Note that the clock signal line and the synchronizing signal line are omitted in the figure.

When an analog image signal input through the input terminal 214 is to be stored in the mass memory 230, the decoder 216 first converts the analog image signal from the input terminal 214 into an internal form (luminance/color difference signal, or RGB signal), and the A/D converter 218 converts the output of the decoder 216 into the digital signal. The output of the A/D converter 218 is temporarily stored via the data bus 220 into the image buffer 236. At this time, the user may input the identification information thereof into the system control circuit 244 using the input means 246.

The compression circuit 222 compresses image data stored in the image buffer 236 for supply to the interface 232, and the system control circuit 244 loads the identification information from the input means 246 via the ID signal line 247 to the ID register 226, which outputs the identification information to be stored to the interface 232. The interface 232 supplies collectively the compressed image data from the compression circuit 222 and the identification information from the ID register 226 to the mass memory 230. Thereby, the image input as an analog signal through the input terminal 214 and its identification information are recorded in the mass memory 230.

Note that the image as thus recorded may be displayed on the monitor 242. In this case, the image buffer 236 reads the image data to be stored in the order of scanning, and supplies it via the data bus 220 to the encoder 238. The encoder 238 converts the image data of internal format into a representation format adapted for the monitor 242, and the D/A converter 240 converts the digital output of the encoder 238 into an analog signal for the application to the monitor 242.

Then an operation in which the image to be stored in the mass memory 230 is reproduced and output in the analog and digital form will be described below. The compressed image data of an arbitrary image and its identification information from the mass memory 230 are read into the interface 232. The interface 232 supplies the compressed image data to the expansion circuit 224, and the identification information to the ID register 226. The expansion circuit 224 expands the compressed image data using an internal memory and the image buffer 236. A restored image data is stored in the image buffer 236.

The image processing circuit 234 subjects the image data in the image buffer 236 to well-known image processings such as filtering, interpolation, edge enhancement and sampling rate conversion. Thereafter, the image data in the image buffer 236 is read on the data bus 220, and output via the interface 212 to the digital input/output terminal 210.

Figure 8:
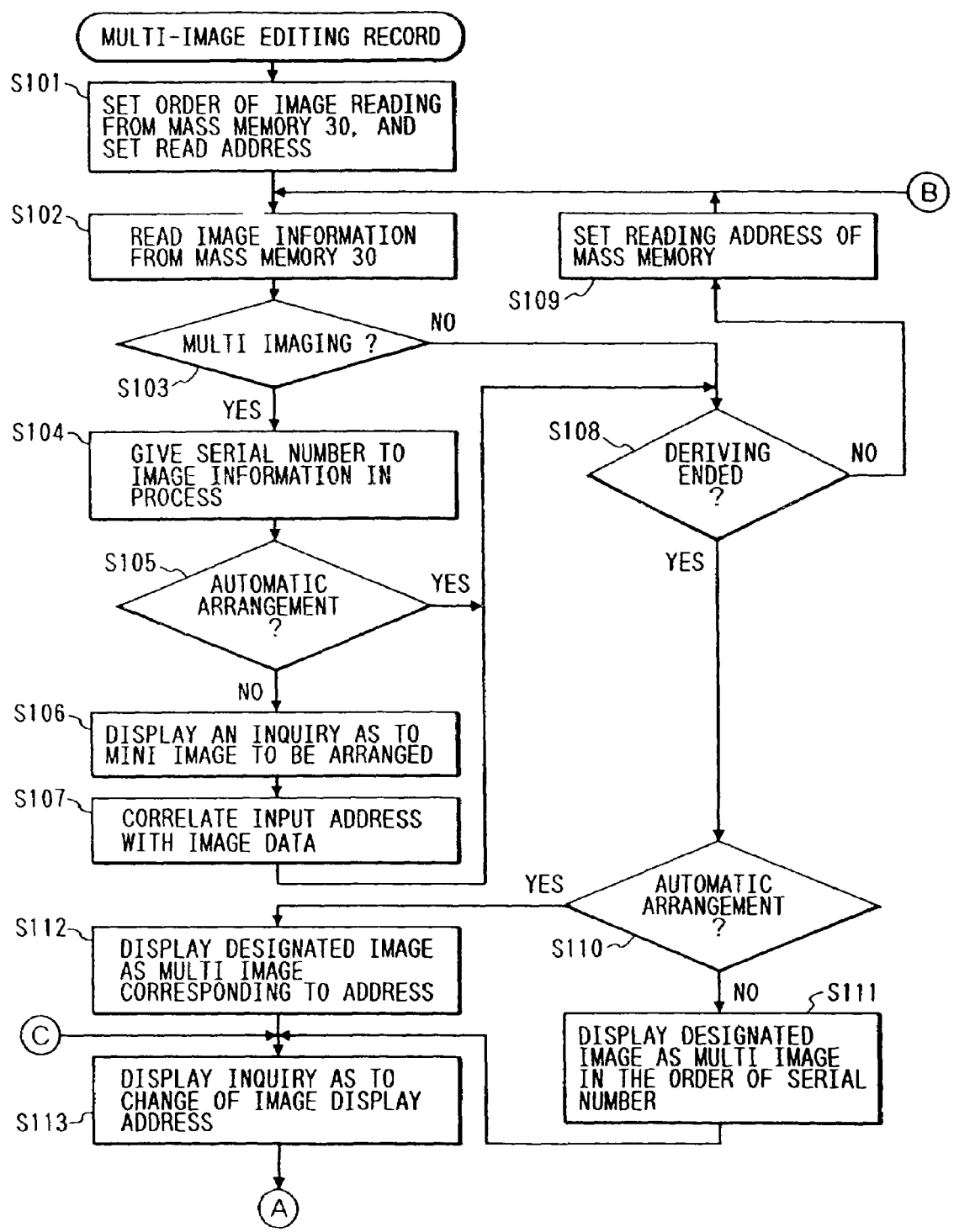
FIG. 8 is a partial flowchart of the operation in the embodiment of FIG. 7.
Figure 9:
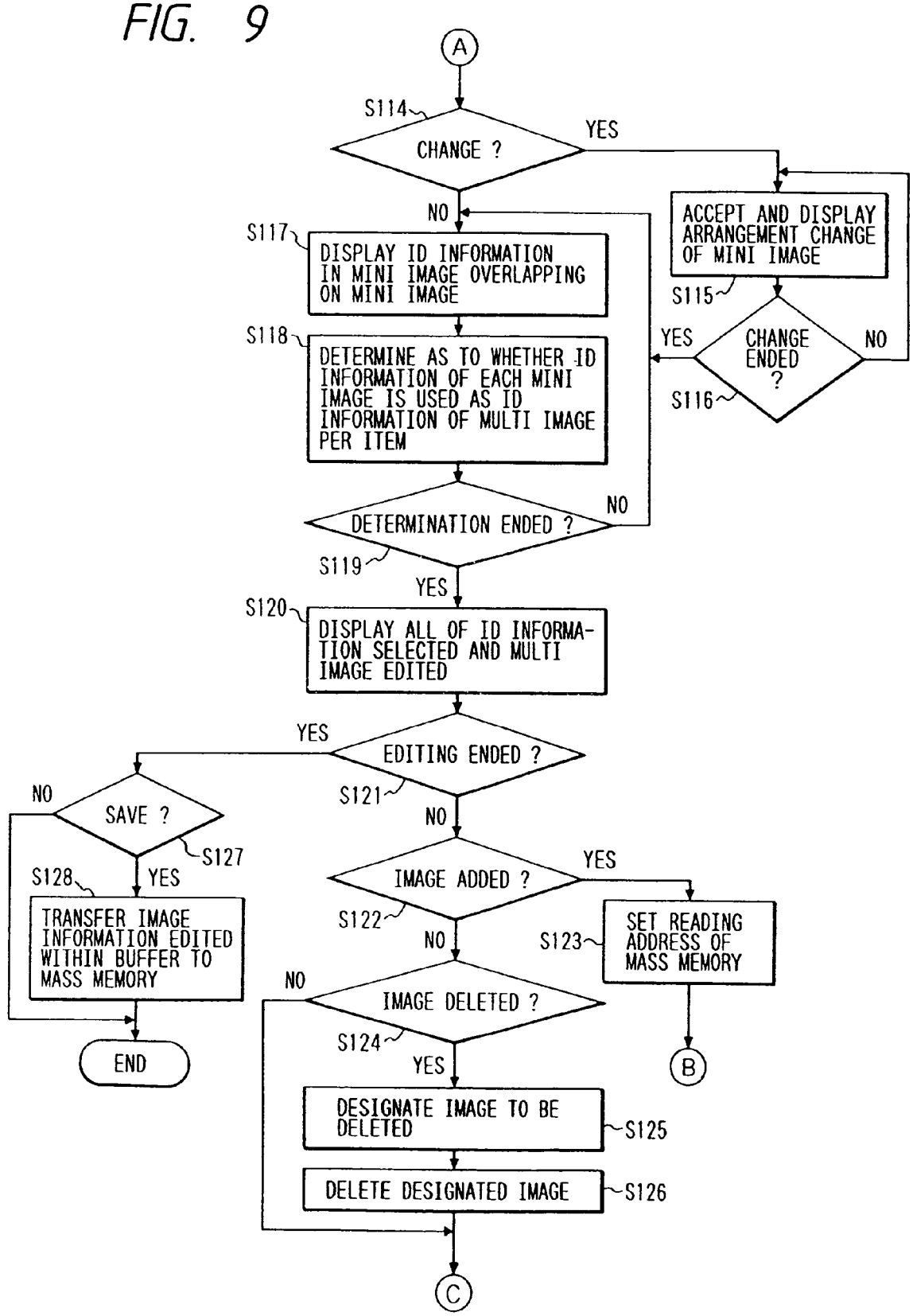
FIG. 9 is a partial flowchart of the operation in the embodiment of FIG. 7.

Next, a multi-image editing and recording operation of this embodiment will be described with reference to the flowcharts as shown in FIGS. 8 and 9. FIGS. 8 and 9 show an operation flowchart with which the multi-image is made up using a plurality of images stored in the mass memory 230. To specify the method with which individual images for the multi-image are arranged on mini-screens, there are two methods in this embodiment: an automatic arrangement mode in which they are arranged on mini-screens in the order of specification for the multi-image, and an individual arrangement mode in which individual images are allocated to respective mini-screens when the multi-image is designated.

First, the order of reading images from the mass memory 230 is set, and the first image reading address is set (S101), for example, in the order of recording addresses, or in the order of recording dates. Of course, it will be appreciated that a plurality of images recorded in the mass memory 230 may be displayed as a multi-image, specifying individually recorded images.

The first image information and its identification information are read from the mass memory 230. The read image information is expanded by the expansion circuit 224, and the read identification information is temporarily stored in the ID register 226. the expanded and restored image is applied to the monitor 242 which displays the image, after being processed by the encoder 238 and the D/A converter 240 (S102).

The user instructs the system control circuit 244 through the input means 246 as to whether or not the multi-image should be designated, seeing the screen of the monitor 242 (S103). When the multi-image is designated, the identification information (e.g., serial number) is appended to the image information during the process (S104). In the individual arrangement mode (S105), the system control circuit 244 causes the display portion, indicated at 245, to display an indication of asking the user on which mini-screen the image being processed should be arranged (S106), and the user correspondingly inputs the address of the mini-screen with the input means 246 (S106). The system control circuit 244 stores the identification number of the image being processed and the address from the input means 246 into the internal memory in a certain relation therebetween (S107).

Thereafter, if there are left any images for the multi-image to pick up (S108), the next image is picked up sequentially (S109).

In the automatic arrangement mode (S105), if there are any images for the multi-image to pick up (S108), the reading address of the mass memory 230 at which the next image is picked up is set (S109), and the next image is read (S102).

If all the images making up the multi-image are designated, that is, the pick-up of images is terminated (S108), in the automatic arrangement mode (S110), the images for the multi-image are arranged on mini-screens in the order of the serial number to form image data for the multi-image, and display the formed multi-image on the monitor 242 (S111). On the other hand, in the manual arrangement mode (S110), the images making up the multi-image are arranged on mini-screens corresponding to the addresses as specified at S107, respectively, to form the image data for the multi-image, and display the formed multi-image on the monitor 242 (S12).

It will be also appreciated that each image making up the multi-image may be stored in the image buffer 236 at S102, or each image making up the multi-image may be read at S111 or S112, reduced to the size corresponding to mini-screen, and stored in the image buffer 236. When the images making up the multi-image are stored in separate mass memories, the mass memories must be exchanged appropriately, and thus the former method is preferable in this case.

The system control circuit 244 asks the user as to whether or not the arrangement of images is changed within the multi-image (S113). If it is changed (S114), the arrangement change of mini-screens is accepted, and the multi-image after the change is displayed (S115). Upon an instruction of change termination, the change is terminated (S116).

The method for the arrangement change of mini-screens is, for example, such that an empty area as large as one mini-screen in the mass memory 230, the internal memory of the system control circuit 244 or the image buffer 236 is used as a temporary saving area for the image data on the mini-screen for which the arrangement change is made so that the images on two mini-screens, to which the arrangement change is designated, are exchanged.

If the image arrangement within the screen of the multi-image is determined (S14, S116), the identification information of the image on each mini-screen is superimposed on each mini-screen (S117). Each identification information has been transferred and stored from the ID register 226 to the ID memory 228 when the multi-image for the images on the mini-screens is designated (S103). It will be appreciated that the images may read from the mass memory 230 and stored via the interface 232 and the ID register 226 into the ID memory 228 at S117. The system control circuit 244 reads the identification information stored in the ID memory 228, and transfers it via the data bus 220 to the image processing circuit 234 for the superimposition on each mini-screen.

When the mini-screen is too small for the identification information to be displayed, it may be displayed on a predetermined area of the monitor screen, or may be scrolled within the display area. Such a display technique is well known as a user interface to the computer. Of course, there may be provided a character display apparatus for displaying the character information such as the identification information.

A selection is made as to whether or not the identification information of each mini-screen should be used as the identification information of the multi-image for each item, for example, the serial number, the recording date, the longitude, the latitude, or the photographing condition (S118). The selected identification information or its partial information is sequentially transferred to the ID register 226, together with the information representing the corresponding mini-screen. When the selection of the identification information is terminated (S119), the edited multi-image and all the selected identification information are displayed (S120). If the edit is not completed (S121), for example, if any mini-screen making up the multi-image is added (S122), the reading address of the next image for the multi-image in the mass memory 30 is set (S123), and then the steps from S102 are repeated. If the image is deleted (S124), an image to be deleted is specified (S125), and the specified image is deleted (S126).

When the edit is completed (S121), an inquiry is made as to whether the image is stored in the mass memory 230 (S127). If it is stored, the image data for the multi-image within the image buffer 236 is transferred to the mass memory 230 (S128). Of course, the image is compressed by the compression circuit 222 in this case. If the image is not stored in the mass memory 230 (S127), the operation is ended.

The selection of images for the multi-image, the specification and change of the arrangement, the deletion and addition of images are not limited to the procedure as shown in FIGS. 8 and 9, but it will be appreciated that a variety of well known methods with the image processing program for the computer can be adopted depending on the size and number of display screens. The identification information can be also dealt with in like manner.

While the identification information for the multi-image was selected from pieces of identification information for the images on mini-screens in the above embodiment, all the pieces of identification information for the images on mini-screens may be stored directly. In this case, as it is unnecessary to make the selecting operation for the identification information for the images on mini-screens, the editing of the multi-image is simplified. The amount of identification information for the multi-image increases significantly, but as the recording capacity necessary for storing the character information is smaller than the image itself, it is not difficult to record the identification information on the image recording medium. It is sufficient to increase the compression ratio of the image data for the multi-image, for example.

Referring now to FIGS. 10, 11, 12, 13 and 14, the recording format for the image information and its identification information will be briefly described. Note that the images A, B, C and D are combined as a multi-image in one screen. It is assumed that the pieces of image information for the images A, B, C and D are I(A), I(B), I(C) and I(D), respectively, and the pieces of identification information thereof are ID(A), ID(B), ID(C) and ID(D), respectively. It is also assumed that the image information for the multi-image is I(X), and its identification information is ID(X); and the pieces of reduced image information on the mini-screens for the multi-image are I(a), I(b), I(c) and I(d), respectively, and the pieces of selected identification information thereof are ID(a), ID(b), ID(c) and ID(d), respectively.

FIG. 10 shows an instance in which the image information and its identification information are contained in one file. H0 is a header as a separation for separating the image information with its identification information from another image information with its identification information. Here, ID(a), ID(b), ID(c) and ID(d) making up the identification information ID(X) for the multi-image are selected from original identification information ID(A), ID(B), ID(C) and ID(D), respectively. If the identification information ID(a), ID(b), ID(c) and ID(d) are arranged, separated by a predetermined delimiter symbol, in the order of arranging the image information I(a), I(b), I(c) and I(d) on the mini-screens, the mutual correspondence can be established.

Figure 11A:
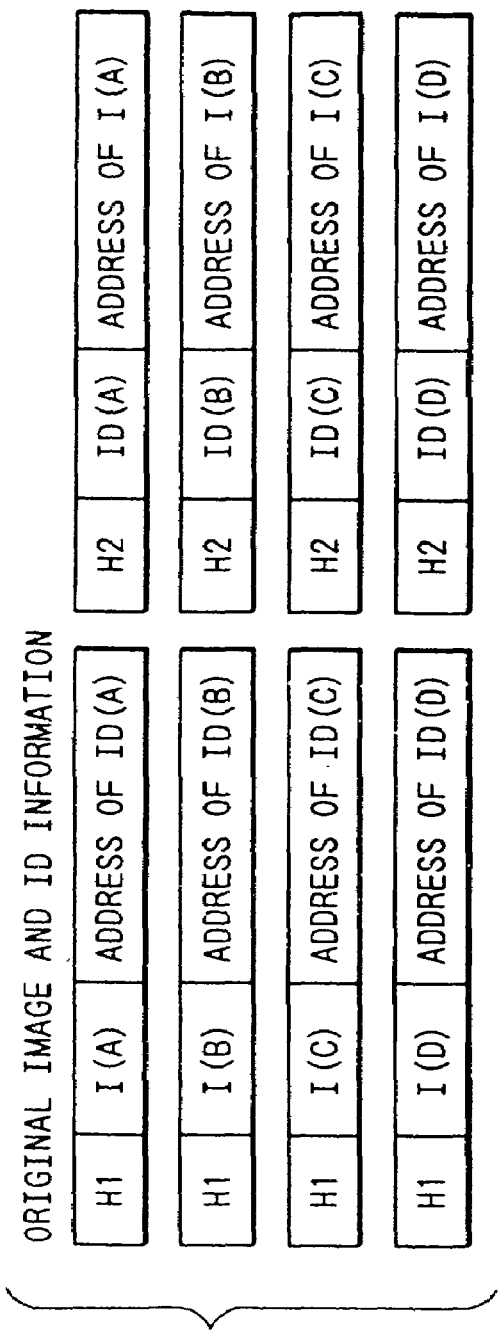
FIGS. 11A and 11B are other examples of the recording format for the image information and its identification information.
Figure 11B:
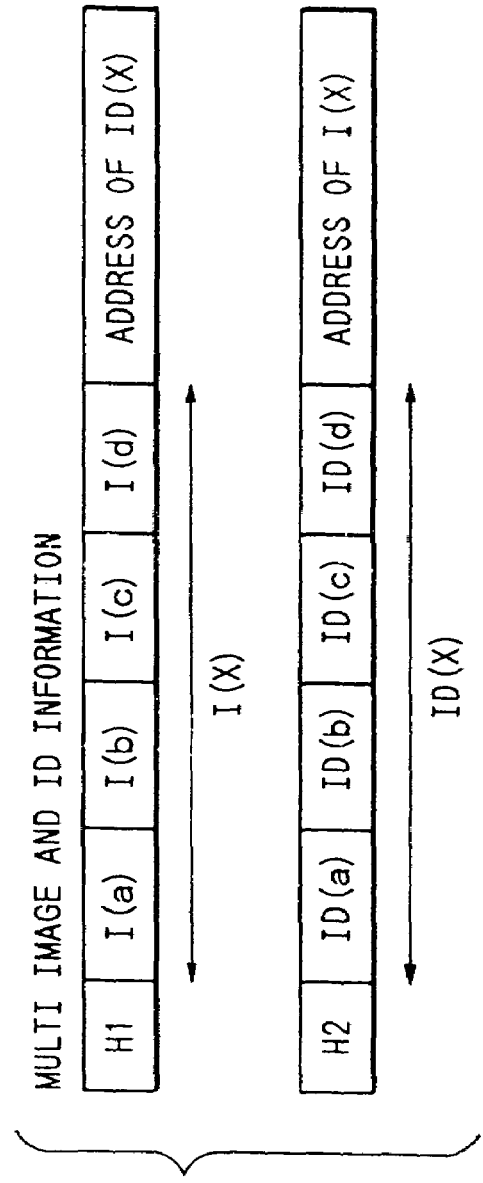

FIG. 11 shows an instance in which the image information and its identification information are contained in separate files. H1 is a header indicating the file of the image information, and H2 is a header indicating the file of the identification information. The image information file includes an address for the corresponding identification information file, and the identification information file includes an address for the corresponding image information file. Thereby, the image information file and the identification information file can be mutually linked. Here, if the identification information ID(a), ID(b), ID(c) and ID(d) are arranged, separated by a predetermined delimiter symbol, in the order of arranging the image information I(a), I(b), I(c) and I(d) on the mini-screens for the multi image, the mutual correspondence can also be established.

Figure 12A:
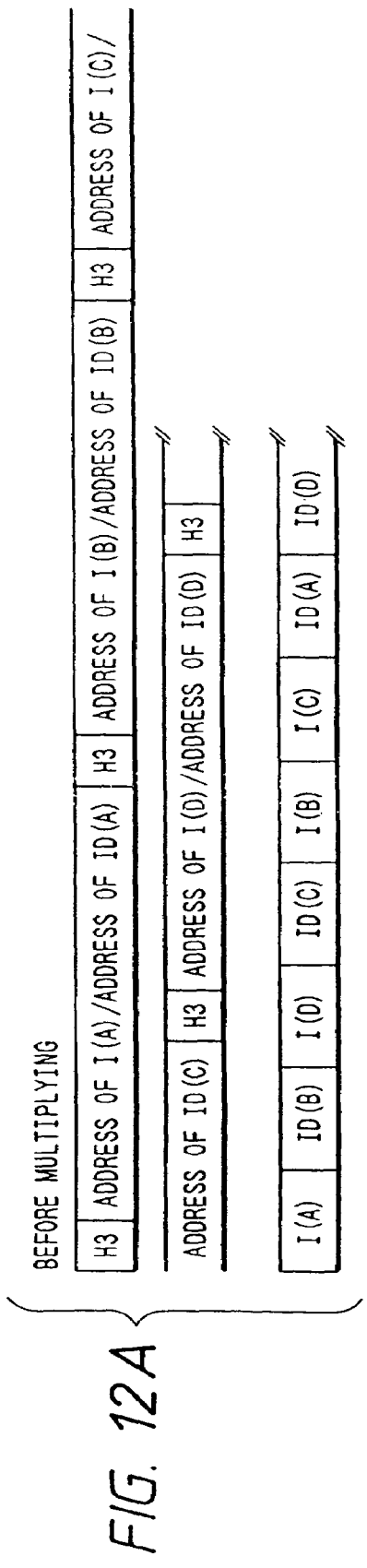
FIGS. 12A and 12B are other examples of the recording format for the image information and its identification information.
Figure 12B:
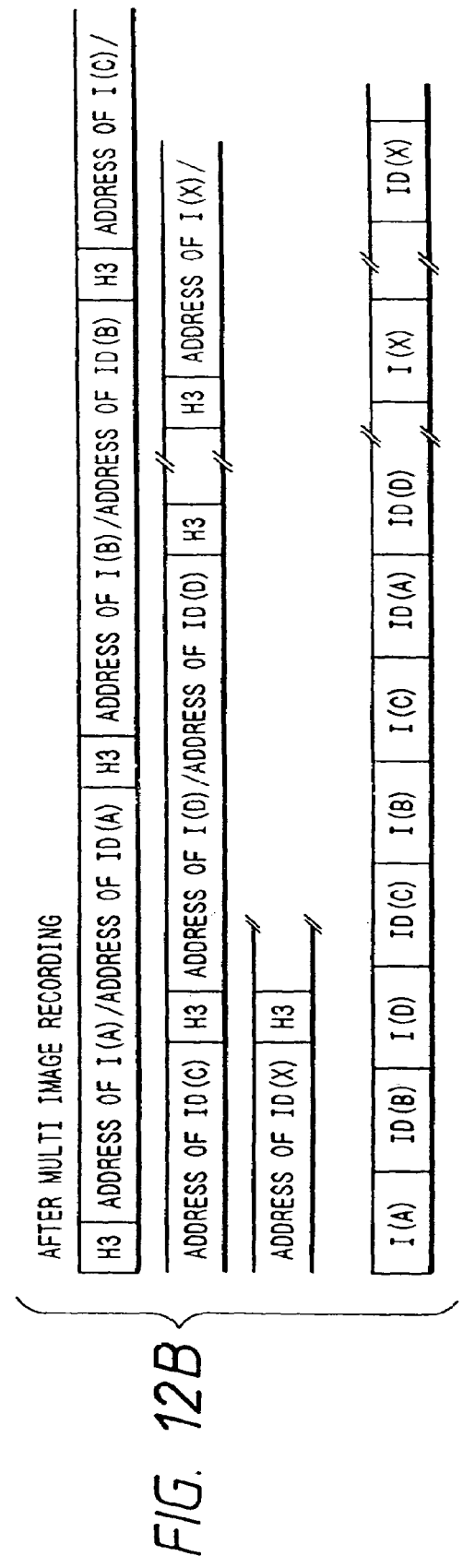

FIG. 12 shows a recording method in which the information recording area for recording the information itself and the address recording area for recording the recording address of each information are separately provided so that the information itself is recorded consecutively on the information recording area and the address for each information is recorded on the address recording area. In the address recording area, the (start) address for the image information and its identification information is sequentially arranged, separated by a header H3. The image information I(X) for the multi-image and its identification information ID(X) are recorded in the information area, as with the image information I(A), I(B), I(C) and I(D), and the identification information ID(A), ID(B), ID(C) and ID(D).

The identification information ID(X) is constituted of the identification information ID(a), ID(b), ID(c) and ID(d) selected from the identification information ID(A), ID(B), ID(C) and ID(D) for the images A, B, C and D, like in the instances as shown in FIGS. 10 and 11.

FIG. 13 is a variation of FIG. 11. The selected identification information ID(a), ID(b), ID(c) and ID(d) on the mini-screens for the multi-image are recorded in separate files, and the correspondence relation between the addresses for the identification information ID(a), ID(b), ID(c) and ID(d) and the mini-screens for the multi-image is recorded in the multi-image file. Of course, when the addresses for the identification information ID(a), ID(b), ID(c) and ID(d) are arranged in the multi-image file in the order of mini-screens for the multi-image, the information about the correspondence relation to the mini-screens is unnecessary.

Figure 14A:
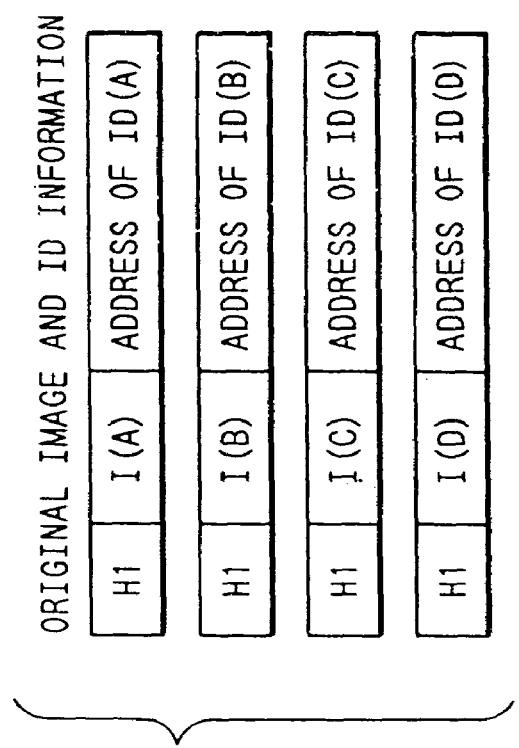
FIGS. 14A and 14B are other examples of the recording format for the image information and its identification information.
Figure 14B:
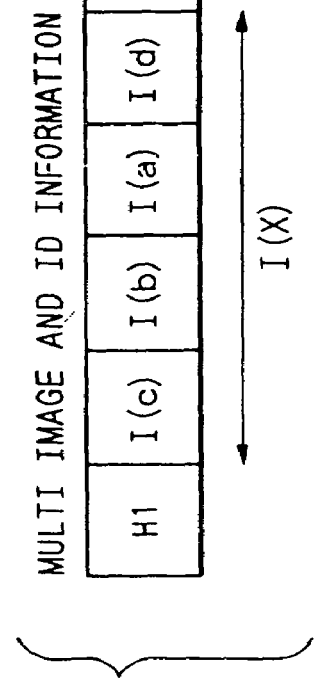

FIG. 14 is a variation of FIG. 13, showing an instance in which all the identification information ID(A), ID(B), ID(C) and ID(D) for the original image on the mini-screens are used as the identification information for the multi-image X. In this case, the addresses of the identification information ID(A), ID(B), ID(C) and ID(D) for the original image are recorded in the identification information area of the file for the multi-image X. Of course, the addresses for the identification information ID(A), ID(B), ID(C) and ID(D) are arranged in the order of the mini-screens. It will be appreciated that the information for the multi-image may be recorded into a second recording medium 231 different from the mass memory 230 in this embodiment.

In the above embodiments, the recording medium called a video floppy or a mass memory was described as the recording medium, but the present invention is not limited to the use of such a medium, and may be an optical disk, a tape medium or a solid state memory such as a line memory or a semiconductor memory.

In the above embodiments, the image information as once reproduced from the recording medium was exemplified, but the present invention is not limited to such image information, and the image information may be supplied via the line. And it may be obtained by converting an object image into the image information, for example, using the image pickup element.

In this case, the identification information for the image may be one of indicating the conditions in which the image information took place, for example, the data information, the longitude, the latitude, or the photographing condition, as in the previous example.

As can be understood from the above description, according to this embodiment, since the ID for the mini-screen for representing the multi-image is used when the multi-image representing picture is recorded as one still picture, it is possible to record relevant appropriate identification information together.

When the multi-image representing picture is recorded as one still picture, it is also possible to record selectively an arbitrary content as the identification information.

Further, when the multi-image representing picture is recorded as one still picture, it is possible to record the identification information for the multi-image with the pieces of identification information for the images on the mini-screens, each piece corresponding to each mini-screen.

What is claimed is:

1. A recording and reproducing apparatus for providing one-multi-image picture, said apparatus comprising:

reproducing means for reproducing from a first recording medium a plurality of image information and a plurality of identification information combined to the plurality of image information, respectively, and producing one-multi-image picture formed of the plurality of image information;

selecting means for selecting one of the identification information among the plurality of identification information and producing identification information corresponding to the one-multi-image picture produced by said reproducing means on the basis of the selected identification information; and recording means for operably recording onto a second recording medium the image information for the one-multi-image picture produced by said reproducing means and the identification information produced by said selecting means corresponding to the one-multi-image picture produced by said reproducing means.

2. The apparatus according to claim 1, wherein said selecting means is manually operated.

3. The apparatus according to claim 1, wherein the first recording medium and the second recording medium are different from each other.

4. The apparatus according to claim 1, wherein the first recording medium and the second recording medium are the same type medium.

5. The apparatus according to claim 1, wherein the identification information comprises information indicating conditions in which image signals representing the plurality of image information are generated.

6. The apparatus according to claim 5, wherein the information indicating the conditions is information indicating the time when the image signals are generated.

7. A recording and reproducing apparatus for providing a one-multi-image picture, said apparatus comprising:

reproducing means for reproducing from a first recording medium a plurality of image information and a plurality of identification information combined to the plurality of image information, respectively, and producing one-multi-image picture formed of the plurality of image information;

selecting means for selecting one of the identification information among the plurality of identification information, and producing identification information corresponding to the one-multi-image picture produced by said reproducing means on the basis of the selected identification information; and recording means for operably recording image information for the one multi-image picture produced by said reproducing means and the identification information produced by said selecting means corresponding to the one-multi-image picture produced by said reproducing means.

8. The apparatus according to claim 7, wherein said selecting means is manually operated.

* * * * *

UNITED STATES PATENT AND TRADEMARK OFFICE
CERTIFICATE OF CORRECTION

PATENT NO. : 7,376,339 B2
APPLICATION NO. : 11/178425
DATED : May 20, 2008
INVENTOR(S) : Shigeru Jinnai et al.

Page 1 of 1

It is certified that error appears in the above-identified patent and that said Letters Patent is hereby corrected as shown below:

<u>COLUMN 1</u>
Line 24, "know" should read --known--.

<u>COLUMN 5</u>
Line 61, "t" should be deleted.

<u>COLUMN 8</u>
Line 51, "read" should read --be read--.

<u>COLUMN 10</u>
Line 20, "multi image" should read --multi-image--.

<u>COLUMN 12</u>
Line 37, "one multi-image" should read --one-multi-image--.

Signed and Sealed this

Tenth Day of February, 2009

JOHN DOLL
*Acting Director of the United States Patent and Trademark Office*